(12) United States Patent
Leštan

(10) Patent No.: US 10,751,771 B2
(45) Date of Patent: Aug. 25, 2020

(54) CURBING TOXIC EMISSIONS FROM REMEDIATED SUBSTRATE

(71) Applicant: ENVIT, Environmental Technologies and Engineering Ltd., Ljubljana (SI)

(72) Inventor: Domen Leštan, Ig (SI)

(73) Assignee: ENVIT, ENVIRONMENTAL TECHNOLOGIES AND ENGINEERING LTD., Ljubljana (SI)

( * ) Notice: Subject to any disclaimer, the term of this patent is extended or adjusted under 35 U.S.C. 154(b) by 0 days.

(21) Appl. No.: 16/208,647

(22) Filed: Dec. 4, 2018

(65) Prior Publication Data
US 2019/0168273 A1 Jun. 6, 2019

(30) Foreign Application Priority Data
Dec. 4, 2017 (GB) .................................. 1720126.0

(51) Int. Cl.
*B09C 1/00* (2006.01)
*B09C 1/08* (2006.01)
*B09C 1/02* (2006.01)

(52) U.S. Cl.
CPC .................. *B09C 1/08* (2013.01); *B09C 1/02* (2013.01); *B09C 2101/00* (2013.01)

(58) Field of Classification Search
CPC ..................................... B09C 1/08; B09C 1/02
See application file for complete search history.

(56) References Cited

U.S. PATENT DOCUMENTS

| 5,965,024 A | 10/1999 | Van Ginkel et al. |
| 2002/0022756 A1 | 2/2002 | Chowdhury et al. |
| 2002/0115899 A1* | 8/2002 | Stanforth ................. A62D 3/33 588/318 |

(Continued)

FOREIGN PATENT DOCUMENTS

| EP | 3 153 246 A1 | 4/2017 |
| JP | 52-59951 | * 5/1977 |

(Continued)

OTHER PUBLICATIONS

Search Report issued in corresponding Great Britain Application No. 1720126.0 dated Jun. 4, 2018.

(Continued)

*Primary Examiner* — Janine M Kreck
(74) *Attorney, Agent, or Firm* — Renner, Otto, Boisselle & Sklar, LLP

(57) ABSTRACT

A process for curbing of emissions of toxic metals and chelating agent from remediated soils, sediments and other substrates contaminated with toxic metals, said process comprising: (a) remediation of contaminated soil, sediment and other substrate with washing solution, said washing solution comprising EDTA or other chelating agent from the group of aminopolycarboxylic acids and their salts and mixtures thereof; (b) addition of 0.05-5% (w/w, dry weight) of zero-valent Fe or Fe compounds from the group of Fe-oxides and Fe-oxide-hydroxides into the slurry phase of soil, sediment and other substrate; (c) mixing of Fe-amended slurry; (d) separation of solid phase of remediated and Fe-amended soil, sediment and other substrate; (e) ageing of remediated and Fe-amended soil, sediment and other substrate for 0.5-45 days.

11 Claims, 5 Drawing Sheets

(56) References Cited

U.S. PATENT DOCUMENTS

| | | | |
|---|---|---|---|
| 2003/0217974 A1* | 11/2003 | Uegami | B09C 1/002 |
| | | | 210/722 |
| 2008/0139867 A1* | 6/2008 | Ida | B09C 1/06 |
| | | | 588/256 |
| 2017/0100755 A1* | 4/2017 | Lestan | B01J 20/00 |

FOREIGN PATENT DOCUMENTS

| | | | | |
|---|---|---|---|---|
| WO | WO-2005042412 A1 * | 5/2005 | | C02F 1/725 |
| WO | 2012/173576 A2 | 12/2012 | | |

OTHER PUBLICATIONS

Bolan et al., "Remediation of heavy metal(loids contaminated soils—to mobilize or to immobilize?", Journal of Hazardous Materials, vol. 266, 2014, pp. 141-166.

Manzano et al., "Influence of iron-rich water treatment residues and compost on the mobility of metal(loid)s in mine soils", Geoderma, vol. 283, Jul. 26, 2016, pp. 1-9.

Zeng et al., "Recycling EDTA solutions used to remediate metal-polluted soils", Environmental Pollution, vol. 133, 2005, pp. 225-231.

Bloem et al., "EDTA application on agricultural soils affect microelement uptake of plants", Sci. Total Environ. vol. 577, 2017, pp. 166-173.

J.M. Tiedje, "Influence of environmental parameters on EDTA biodegradation in soil and sediments", J. Environ. Qual., vol. 6, 1997, pp. 21-26.

Wang, et al., "Spectrophotometric determination of EDTA in aqueous solution through ferroin formation using sodium sulfite as the reducer", Chemosphere 91, 2003, pp. 351-357.

\* cited by examiner

CURBING TOXIC EMISSIONS FROM REMEDIATED SUBSTRATE

The present invention relates to an addition of zero-valent Fe and Fe-compounds into the slurry phase of soil, sediment and other substrates to prevent emissions of toxic metals and chelating agent from the soil, sediment and other contaminated substrates remediated with EDTA and other aminopolycarboxylic chelating agents.

RELATED APPLICATIONS

The process described in the present application includes the processes described in patent application WO 2012173576 A2 entitled "Washing of contaminated soils" and in U.S. Pat. No. 10,124,378 issued Nov. 13, 2018 (corresponding to patent application EP 3 153 246 A1) entitled "Soil and sediment remediation", both of the same applicant. The entire contents of these two applications are hereby incorporated by reference into the present application.

BACKGROUND OF THE INVENTION

Remediation of soil, sediment and other substrates (in the following text simply "soil") by washing, extraction, leaching, and flushing (in the following text simply "washing") with chelant is a process by which chelant (i.e. EDTA) and toxic metals form water-soluble complexes (chelates) and the washing solution is separated from the solid phase. However, toxic metals chelates with EDTA partly remain in washed soil. In the past, EDTA-based soil remediation has been compromised by extensive emissions of chelated toxic metals into the subsoil. In polluted soils, up to 20% of EDTA applied for remediation can be adsorbed into the soil, thereby leading to the risk of uncontrolled post-remedial leaching (Q. R. Zeng, S. Sauve S, H. E. Allen, W. H. Hendershot, Recycling EDTA solutions used to remediate metal-polluted soils, Environ. Pollut. 133 (2005), pp. 225-231). EDTA is characterized by low levels of biodegradability and high levels of environmental persistence (E. Bloem, S. Haneklaus, R. Haensch, E. Schung, EDTA application on agricultural soils affect microelement uptake of plants, Sci. Total Environ. 577 (2017), pp. 166-173). A 3-46% mineralization of 2-4 mg EDTA per kilogram of soil for the 13 surface soils after 15 weeks was documented (J. M. Tiedje, Influence of environmental parameters on EDTA biodegradation in soil and sediments, J. Environ. Qual. 6 (1997), pp. 21-26).

The patent application EP 3 153 246 A1 entitled "Soil and sediment remediation" of the same applicant describes a process wherein emissions of chelant and toxic metals is reduced with soil aging and remediated soil deposition on a reactive permeable barrier. The U.S. Pat. No. 5,965,024 entitled "Microbiological degradation of alkylene amine acetates" pertains to a process for the degradation of EDTA in waste waters under alkaline conditions but remains silent on EDTA degradation in EDTA-washed soil and sediment.

None of these known processes uses Fe and Fe-containing compounds to curb toxic emissions from soil, sediment or other substrate washed with chelant.

SUMMARY OF THE INVENTION

The present invention aids in the washing of soils, sediments and other substrates contaminated with toxic metals using ethylenediamine tetraacetate (EDTA) and other aminopolycarboxylic chelants. Specifically, the present invention solves the problem of toxic emissions from washed soils, sediments and other substrates.

The process according to the invention is imbedded into a process for remediation of soils contaminated with toxic metals, wherein the toxic metals are selected from the group consisting of Pb, Zn, Cd, Cu, Hg, Ni, Mo, Tl, Cr, U, Cs and Sr.

Soils are washed with chelant selected from the group of aminopolycarboxylic acids such as EDTA to form a slurry phase. The concentration of chelant and volume ratio between the soil solid phase and the washing solution are conventional in the art. Material containing zero-valent Fe, Fe-oxides or Fe-oxide-hydroxides or a mixture thereof is mixed thoroughly into the soil slurry phase in a concentration ranging from 0.05 to 5% (w/w) using conventional equipment. The mixing duration is conventional in the art. Toxic chelates are presumably attracted to the surface of the iron, where they share electrons with the iron and are detoxified by immobilisation and degradation mechanisms. The granulation of Fe and Fe compounds may vary from nanoparticles to grains with <2 mm in diameter. Preferably, the cheap scrap zero-valent Fe can be obtained in the form of shavings or turnings from metal-processing shops material. After addition of Fe and Fe-compounds into the slurry phase the solid and liquid phases are separated using a filter press or other conventional methods known to one skilled in art. The soil solid phase may be rinsed with clean solutions before and after addition of Fe and Fe-compounds to remove the bulk of toxic chelates and recycle the chelant, as is for example described in the patent application EP 3 153 246 A1.

In the preferred embodiment of the process the remediated and Fe-amended soil is aged for up to 45 days to allow for effective reduction of toxic metals and chelant concentration in soil extracts and leachates. The remediated and Fe-amended soil is aged by short-term storage or by maintaining a neutral water balance in in situ deposited soil (i.e. by shielding the soil in cases of excessive rainfall).

BRIEF DESCRIPTION OF THE DRAWINGS

Preferred embodiments of the invention will now be described with reference to the appended drawings, wherein.

DESCRIPTION OF PREFERRED EMBODIMENT

The acidic (pH=5.1) industrially contaminated soil (50 kg, dry weight) from Arnoldstein (Austria) with 860 mg $kg^{-1}$ Pb, 330 mg $kg^{-1}$ Zn and 3 mg $kg^{-1}$ Cd was washed in a mixing vessel with 60 mM EDTA $kg^{-1}$ solution (w:V ratio 1:1). According to the process described in the invention an addition of 1% (w/w) of zero-valent Fe (<0.5 mm granules) was applied into the soil slurry phase. The soil solid phase was then separated from slurry using a chamber filter press and in-press rinsed with 3 volumes of cleansed rinsing solution to remove the bulk of toxic chelates. The rinsing solution was cleansed and recycled as described in the patent application "Soil and sediment remediation" EP 3 153 246 A1.

Soil washing with EDTA removed 78, 20 and 83% of the Pb, Zn and Cd, respectively. Lower levels of Zn extractability from soil is known to one skilled in art.

The washed (remediated) soil contained 28% of moisture and was stored at room temperature for 8 weeks. Periodically, a 30 g sample was taken from the bulk of the soil and extracted on shaker with 50 mL of deionized water. The Pb, Zn, Cd and Fe concentration in extracts was determined using atomic absorption spectroscopy (AAS). The EDTA was assessed spectrophotometrically using modified method of Wang et al. (J. Wang, J. Yu, X. Z. Kong, L. Hou, Spectrophotometric determination of EDTA in aqueous solution through ferroin formation using sodium sulfite as the reducer, Chemosphere 91 (2003), pp. 351-357). EDTA was measured as a part of the total chelating activity in the extract comprising of concentrations of EDTA and of the humic acids dissolved from soil organic matter during soil-washing process.

Figure 1:
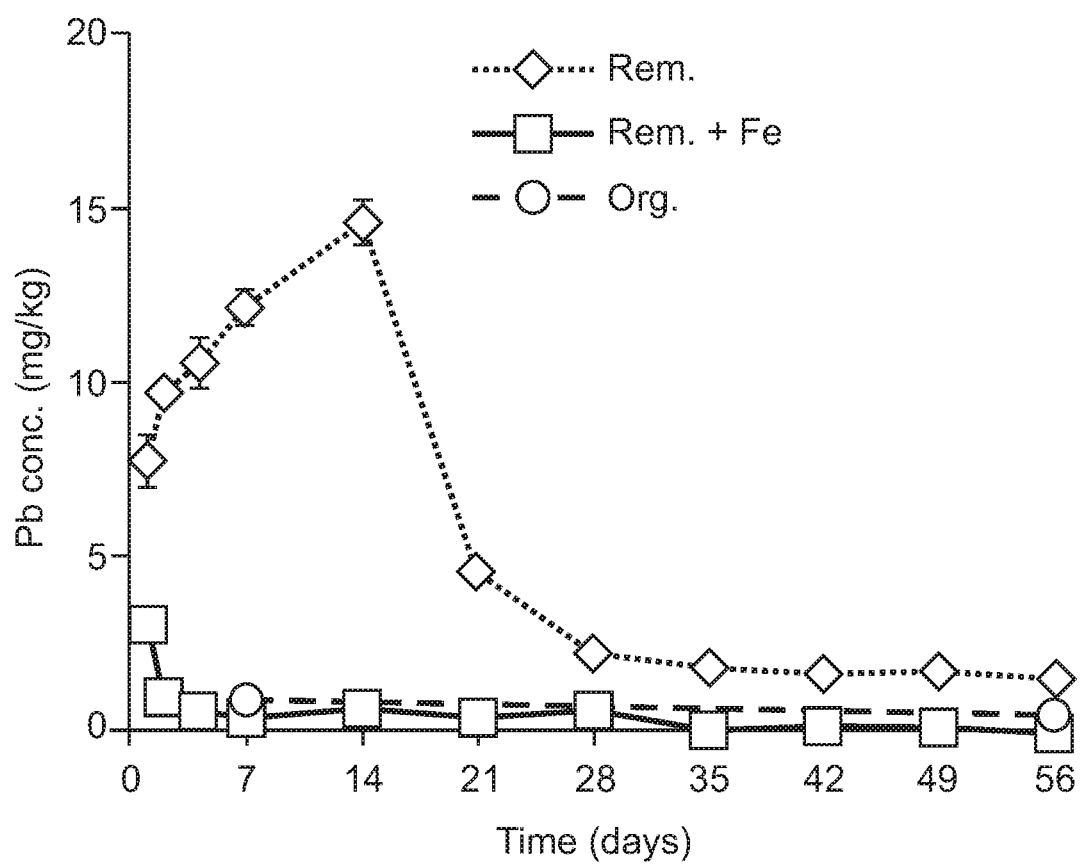
FIG. 1 shows potential Pb emissions (Pb concentration in extracts) from original (Org.), remediated but not Fe-amended (Rem.), and remediated and Fe-amended soil (Rem.+Fe). Data are given as means and standard deviations of three replicates.
Figure 2:
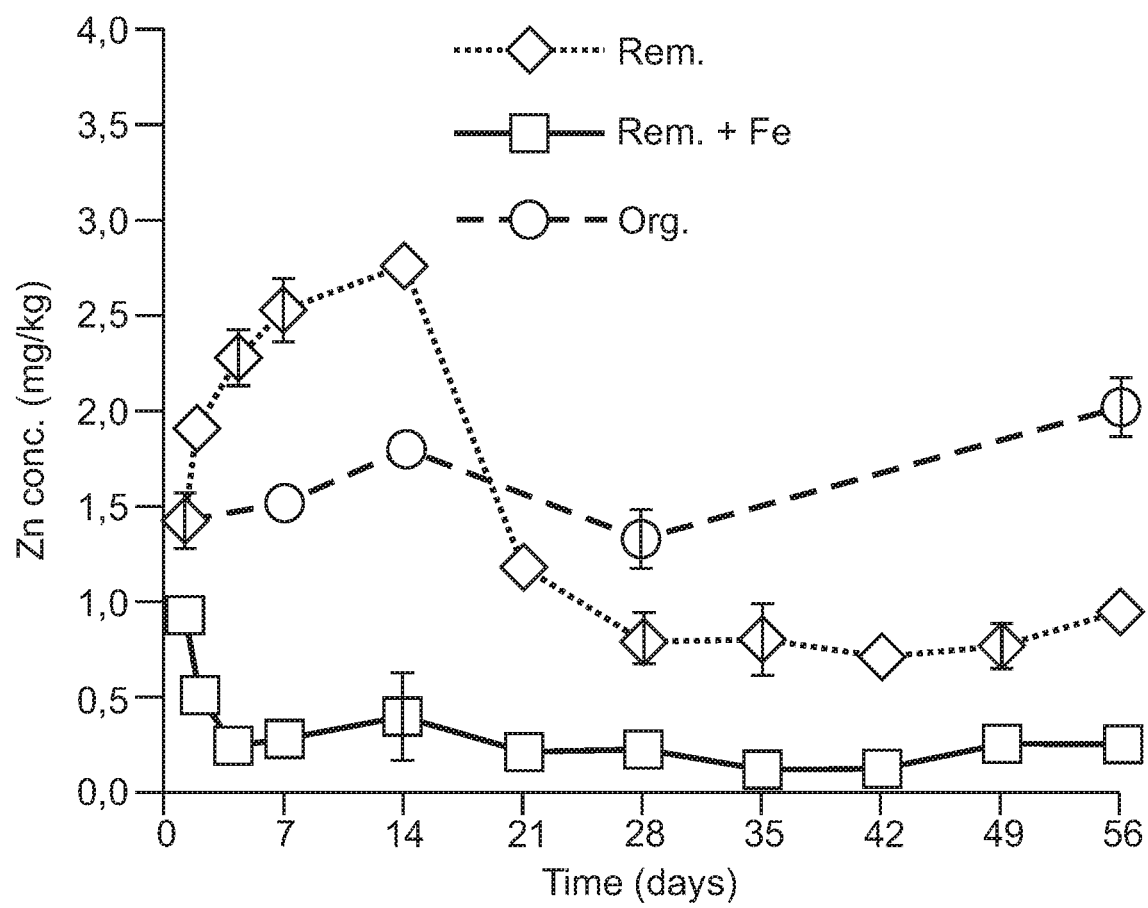
FIG. 2 shows potential Zn emissions (Zn concentration in extracts) from original (Org.), remediated but not Fe-amended (Rem.), and remediated and Fe-amended soil (Rem.+Fe). Data are given as means and standard deviations of three replicates.
Figure 3:
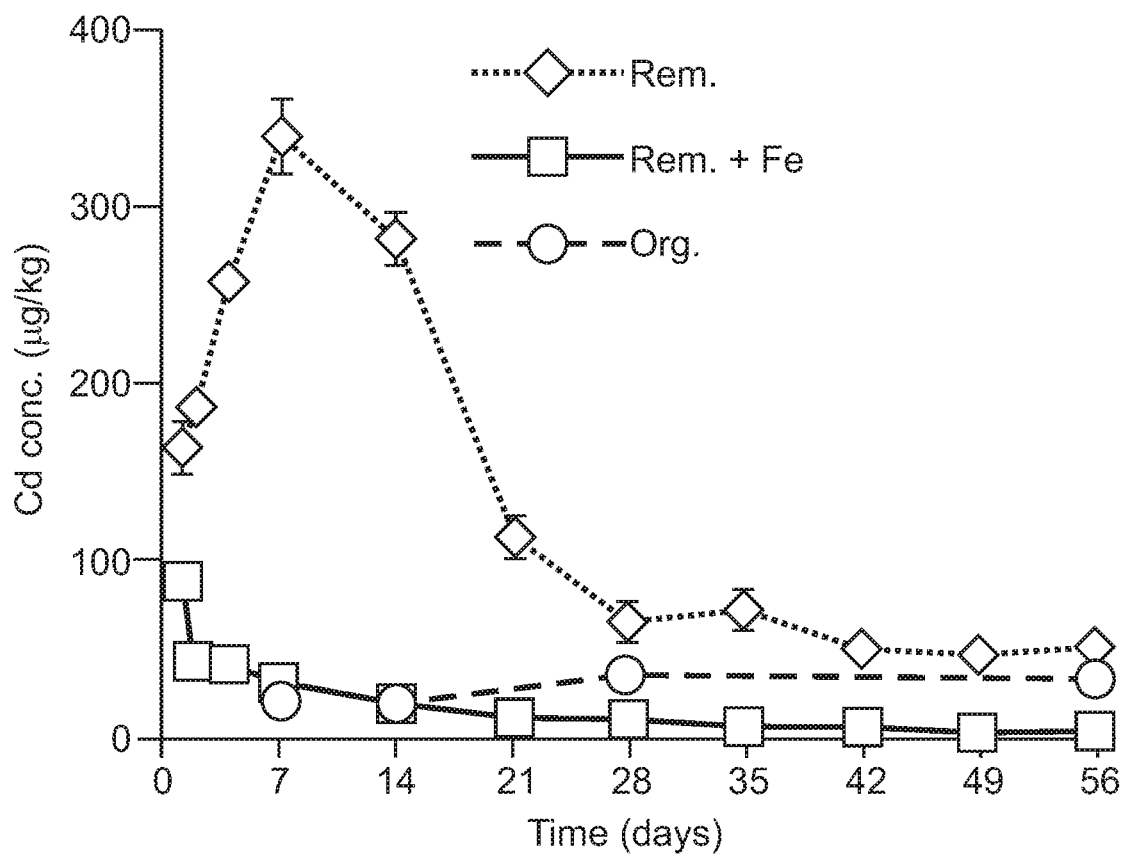
FIG. 3 shows potential Cd emissions (Cd concentration in extracts) from original (Org.), remediated but not Fe-amended (Rem.), and remediated and Fe-amended soil (Rem.+Fe). Data are given as means and standard deviations of three replicates.
Figure 4:
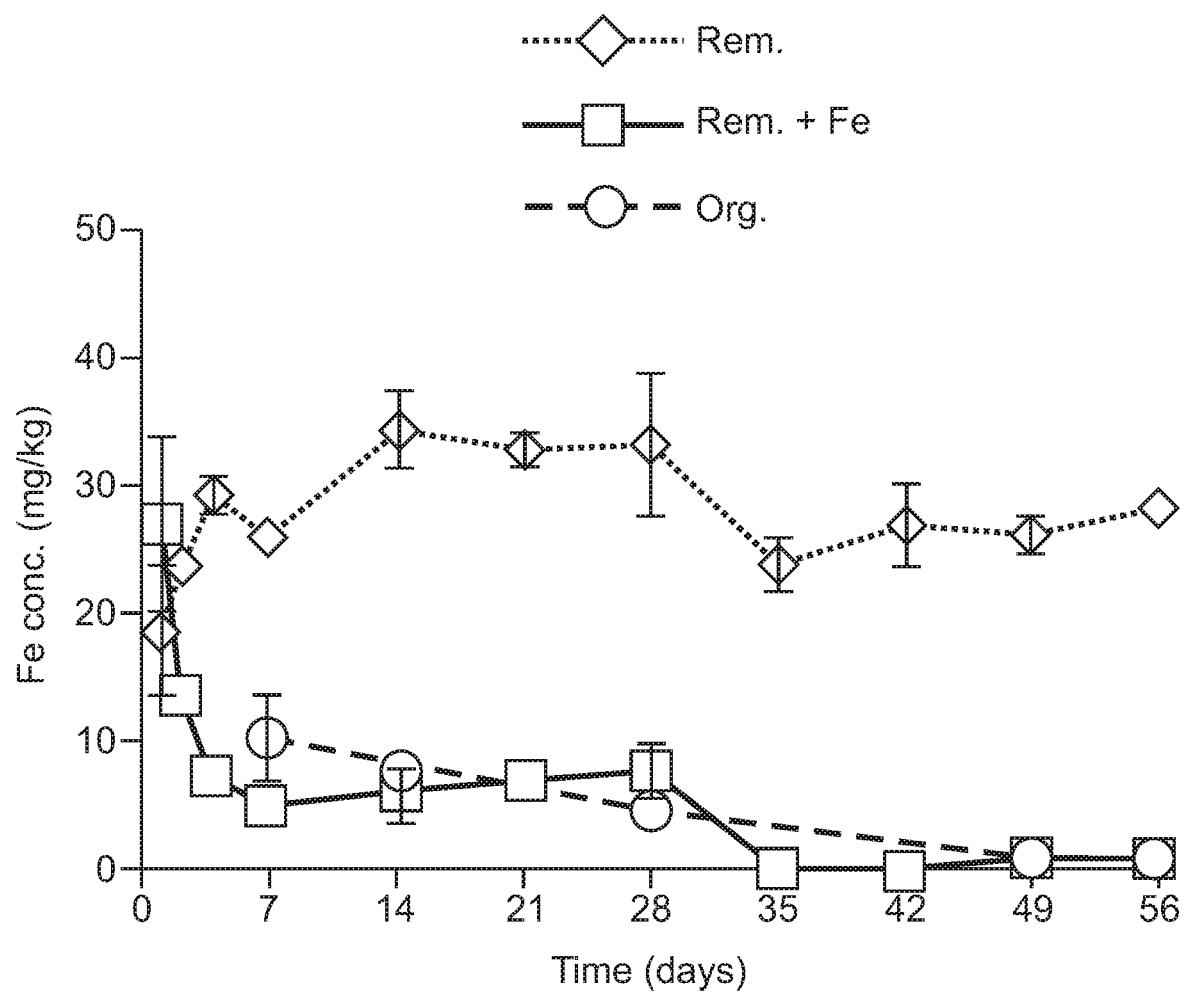
FIG. 4 shows potential Fe emissions (Fe concentration in extracts) from original (Org.), remediated but not Fe-amended (Rem.), and remediated and Fe-amended soil (Rem.+Fe). Data are given as means and standard deviations of three replicates.
Figure 5:
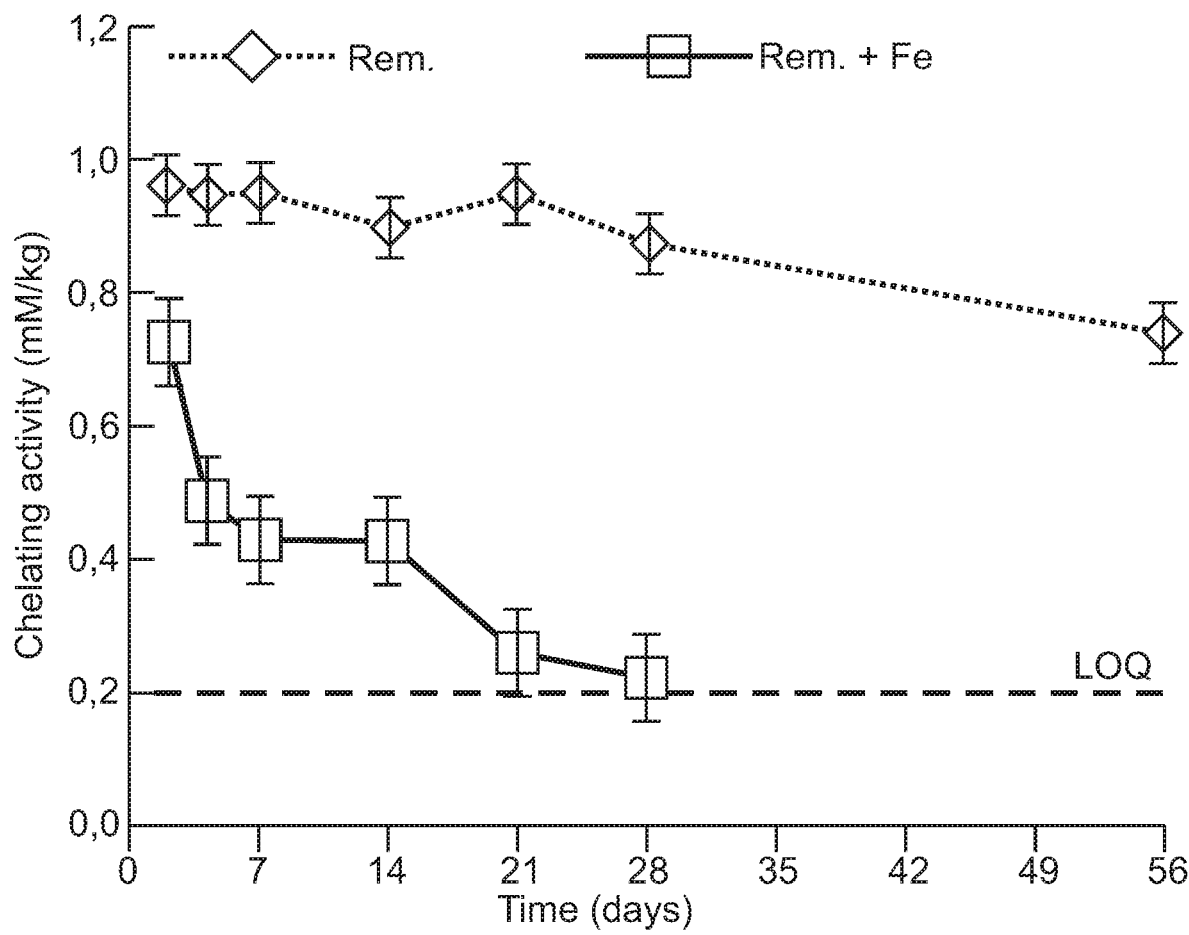
FIG. 5 shows potential EDTA emissions measured as a total chelating activity of EDTA and dissolved humic acids in extracts from remediated but not Fe-amended (Rem.) and remediated and Fe-amended soil (Rem.+Fe). Data are given as means and standard deviations of three replicates. The broken line denotes the limit of quantification (LOQ).

As apparent from FIGS. 1, 2 and 3 the Fe amendment significantly reduces extractability of toxic metals (Pb, Zn and Cd), Fe (FIG. 4) and EDTA (FIG. 5) from remediated soil. Furthermore, after 1-7 days of storage the potential emissions of metals from remediated and Fe-amended soil were equal or lower than from original, not-washed soil.

The invention claimed is:

1. A process for curbing of emissions of toxic metals and chelating agent from soils, sediments and other substrates contaminated with toxic metals, said process comprising:
    (a) remediation of contaminated soil, sediment and other substrate by washing with washing solution, said washing solution comprising EDTA or other chelating agent from the group of aminopolycarboxylic acids and their salts and mixtures thereof to form a slurry phase;
    (b) addition of 0.05-5% (w/w, dry weight) of zero-valent Fe or Fe compounds from the group of Fe-oxides and Fe-oxide-hydroxides into the slurry phase of soil, sediment and other substrate;
    (c) mixing of Fe-amended slurry;
    (d) separation of solid phase of remediated and Fe-amended soil, sediment and other substrate; and
    (e) ageing of remediated and Fe-amended soil, sediment and other substrate for 0.5-45 days.

2. The process of claim 1, wherein in step (b) the granulation of Fe and Fe compounds can vary from nanoparticles to grains with <2 mm in diameter.

3. The process of claim 1, wherein the Fe and Fe compounds can be in step (b) delivered into the slurry phase alone or in formulation with fertilizers, immobilizators of toxic elements and compounds, other conditioners and materials which enhance soil, sediment and other substrate quality.

4. The process of claim 1, wherein the said solid phase may be before and after addition of Fe and Fe-compounds in step (b) rinsed with clean solutions to remove the bulk of toxic metals and chelating agent.

5. The process of claim 1, wherein the remediated and Fe-amended soil, sediment and other substrate is in step (e) aged by short-term storage or by in situ maintaining a neutral water balance in remediated material.

6. The process of claim 2, wherein the Fe and Fe compounds can be in step (b) delivered into the slurry alone or in formulation with fertilizers, immobilizators of toxic elements and compounds, other conditioners and materials which enhance soil, sediment and other substrate quality.

7. The process of claim 2, wherein the said solid phase may be before and after addition of Fe and Fe-compounds in step (b) rinsed with clean solutions to remove the bulk of toxic metals and chelating agent.

8. The process of claim 3, wherein the said solid phase may be before and after addition of Fe and Fe-compounds in step (b) rinsed with clean solutions to remove the bulk of toxic metals and chelating agent.

9. The process of claim 2, wherein the remediated and Fe-amended soil, sediment and other substrate is in step (e) aged by short-term storage or by in situ maintaining a neutral water balance in remediated material.

10. The process of claim 3, wherein the remediated and Fe-amended soil, sediment and other substrate is in step (e) aged by short-term storage or by in situ maintaining a neutral water balance in remediated material.

11. The process of claim 4, wherein the remediated and Fe-amended soil, sediment and other substrate is in step (e) aged by short-term storage or by in situ maintaining a neutral water balance in remediated material.

* * * * *